A. JAQUISH.
VALVE.
APPLICATION FILED AUG. 15, 1914.
1,139,290.
Patented May 11, 1915.
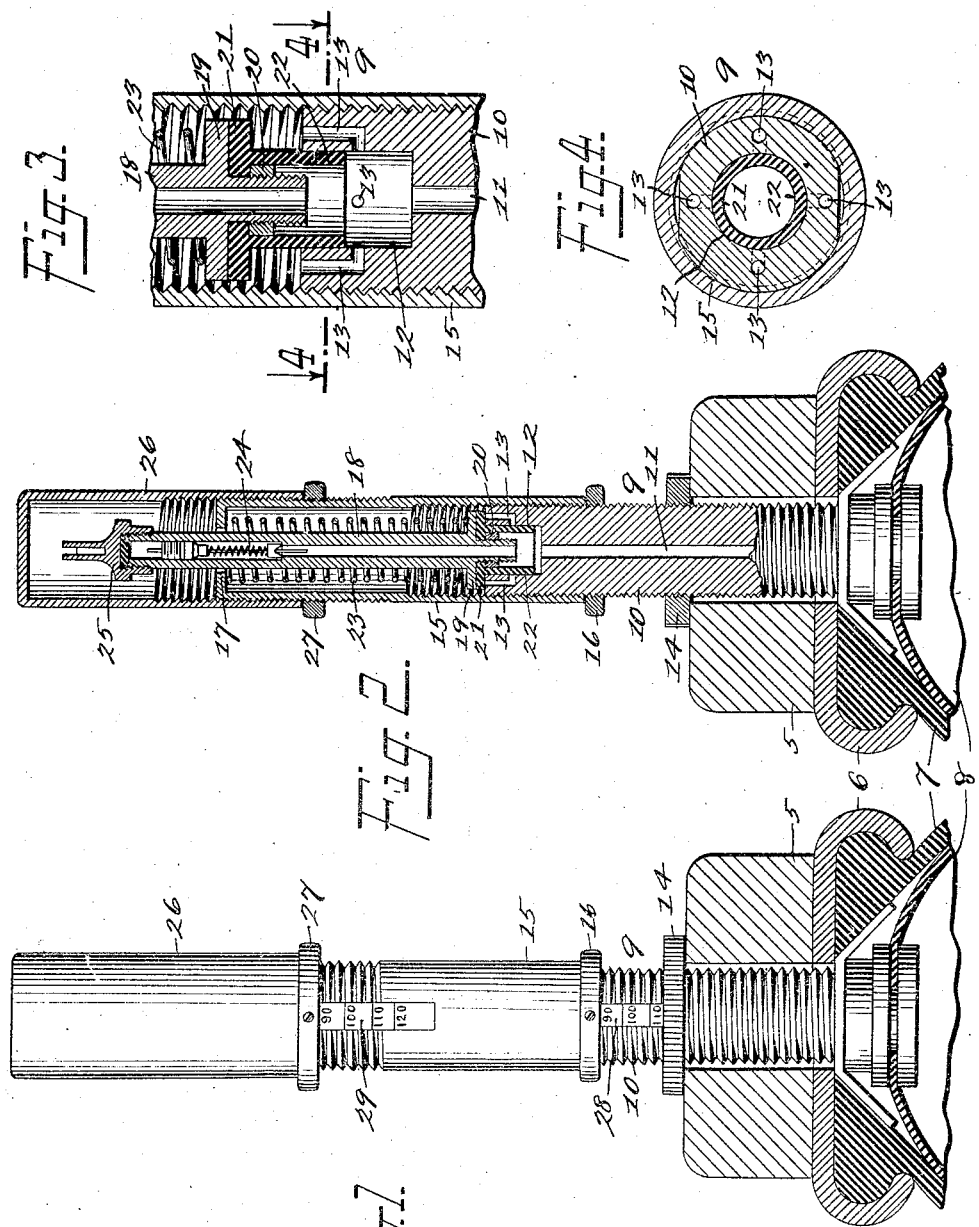

UNITED STATES PATENT OFFICE.

ARTHUR JAQUISH, OF ONTARIO, OREGON.

VALVE.

1,139,290. Specification of Letters Patent. Patented May 11, 1915.

Application filed August 15, 1914. Serial No. 856,958.

*To all whom it may concern:*

Be it known that I, ARTHUR JAQUISH, a citizen of the United States, and a resident of Ontario, in the county of Malheur and State of Oregon, have invented certain new and useful Improvements in Valves, of which the following is a specification.

My invention relates to air valves, such as used in pneumatic tires, and the main object thereof is to provide a valve which automatically prevents a blow-out due to too great pressure within the tire; a further object is to provide means, in connection with such safety device, for determining the extreme pressure which it is desired to have within the tire; and further objects are to provide such valves which are simple in construction and use, well adapted for the purpose for which they are designed, and comparatively inexpensive.

My invention is fully set forth in the following specification, of which the accompanying drawings form a part, in which the separate parts are designated by the same reference characters in each of the views, and in which:—

Figure 1 is an exterior view of a valve constructed in accordance with my invention, as adapted for pneumatic tires; Fig. 2 is a central, vertical, section therethrough; Fig. 3 is an enlarged fragmentary view similar to Fig. 2, but showing the parts in a different position; and Fig. 4 is a section taken on the line 4—4 of Fig. 3.

In the drawings forming a part of this application I have shown a present preferred form of embodiment of my invention, comprising the felly 5 of a vehicle wheel, the rim 6, the shoe 7, the inner tube 8, and the valve 9, said valve being mounted in the usual manner.

The valve comprises an externally threaded tube 10 having a bore 11 therethrough, an enlarged chamber 12 at the upper end thereof, and a plurality of by-passes 13 opening through the upper end of the tube 10 and into the chamber 12 at a point intermediate its height, a nut 14 holding the valve casing or tube on the wheel.

Threaded upon the tube 10 is a sleeve 15 adapted to be locked in adjusted position by means of a jam-nut 16, and said sleeve is provided with an opening 17 arranged centrally of the top thereof, and screw-threaded on its exterior. Freely movable in the opening 17 is a tube 18 having a flange 19 adjacent its lower end, and which end, below said flange, is screw-threaded to receive a nut 20 adapted to hold a cup-shaped washer 21 in place, the horizontal portion of which normally covers the upper ends of the by-passes 13, and the tubular, dependent portion 22 thereof normally covers the lower ends of said by-passes and being approximately of the same diameter as the chamber 12, and I provide a coil-spring 23, bearing against the upper end of the sleeve 15 and against the flange 19 of the tube 18 whereby said washer 21 is normally held on its seat over the said by-passes.

The tube 18 contains the usual valve 24 and nipple 25, by means of which air may be pumped into the tire but which prevents the escape of the air so pumped, and I also provide a cap 26 adjustably threaded upon the sleeve 15 and adapted to be locked in adjusted position by means of a jam-nut 27, the jam-nuts 16 and 27 being each, preferably, provided with a set-screw, as shown. The tube 10 is provided with a scale 28 to be read in connection with the position of the sleeve 15, and said sleeve 15 has a scale 29 to be read in connection with the cap 26, the former to show the degree of compression of the coil-spring 23, and the latter to show the degree of play possible to the valve tube 18.

When the pressure within the tire exceeds the adjusted degree of resistance of the coil-spring 23, the tube 18 is raised by the air below the washer 21, whereby the lower ends of the by-passes 13 are cleared by the dependent portion 22 of the washer and the air is free to escape from within the tire until the force of the coil-spring 23 is greater than the air pressure within the tire, at which time the portion 22 of the washer again moves downwardly over the entrances to the by-passes, and the escape of the air is stopped.

By screwing the sleeve downwardly on the tube 10, the resisting power of the coil-spring 23 is correspondingly increased, and a greater air pressure within the tire is possible without raising the safety valve or washer 21, and, if desired, the cap may be screwed down so tight that the nipple 25 bears against the inner end of the cap and no movement of the tube 18 or safety valve is possible.

In view of the close fit of the dependent portion 22 of the safety washer 21 in the chamber 12, and in view also of the flexibility of said washer, being preferably made of rubber, the air seeking to escape from within the tire merely forces the portion 22 of the washer more closely on its seat over the entrances to the by-passes 13, thus preventing any possibility of leakage of air from the tire.

It will thus be seen that I provide a safety valve for pneumatic tires which prevent blow-outs when inflating the tire or when the tire is subjected to sudden jolts; which is very simple in construction; which is very inexpensive; and which provide a safety element which is capable of a considerable degree of movement without opening the emergency by-passes, or permitting leakage of air therethrough.

While I have shown a present preferred form of construction, it will be evident that changes thereover may be made, within the scope of the following claim, without departing from the spirit of my invention, or sacrificing its advantages.

Having fully described my invention, what I claim as new, and desire to secure by Letters Patent, is:—

The combination with a pneumatic tire, of a tube provided with by-passes, a sleeve adjustable thereon, a supplemental tube having a nipple thereon, a valve therein, a coil-spring maintaining said supplemental tube against said first named tube, and a washer carried by said supplemental tube, said washer comprising a horizontal member and a dependent member, each of which covers corresponding ends of said by-passes.

In testimony whereof I have signed my name to this specification in the presence of two subscribing witnesses.

ARTHUR JAQUISH.

Witnesses:
H. L. NOE,
ROBERT ODELL.

Copies of this patent may be obtained for five cents each, by addressing the "Commissioner of Patents, Washington, D. C."